(12) United States Patent
Saito et al.

(10) Patent No.: US 6,729,452 B2
(45) Date of Patent: May 4, 2004

(54) FLUID TRANSMITTING DEVICE WITH LOCK-UP CLUTCH

(75) Inventors: Kiyoshi Saito, Shizuoka (JP); Tetsuro Maruyama, Saitama (JP)

(73) Assignees: Yutaka Giken Co., Ltd., Shizuoka (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/225,299

(22) Filed: Aug. 22, 2002

(65) Prior Publication Data

US 2003/0066726 A1 Apr. 10, 2003

(30) Foreign Application Priority Data

Aug. 22, 2001 (JP) ........................ 2001-251945
May 24, 2002 (JP) ........................ 2002-150435

(51) Int. Cl.⁷ .............................................. F16D 35/00
(52) U.S. Cl. ...................................... 192/3.29; 192/210
(58) Field of Search ............................. 192/3.29, 3.28, 192/3.3, 207, 212, 213, 213.1, 213.11, 210

(56) References Cited

U.S. PATENT DOCUMENTS 5,667,042 A * 9/1997 Olsen et al. ................ 192/3.29
6,070,704 A * 6/2000 Sasse ......................... 192/3.28
6,112,869 A * 9/2000 Krause et al. .............. 192/3.29
6,471,021 B1 * 10/2002 Sasse et al. ................ 192/3.29
2002/0195305 A1 * 12/2002 Krause et al. .............. 192/3.29

FOREIGN PATENT DOCUMENTS

JP          5-296313          11/1993

* cited by examiner

*Primary Examiner*—Pam Rodriguez
(74) *Attorney, Agent, or Firm*—Arent Fox Kintner Plotkin & Kahn, PLLC

(57) ABSTRACT

A fluid transmitting device includes a side cover connected to a pump impeller and defining a clutch chamber between the side cover and an outer surface of a turbine runner, and a lock-up clutch which includes a clutch piston connected to the turbine runner. The clutch chamber is divided by the clutch piston into an inner oil chamber and an outer oil chamber. The inner oil chamber is divided into primary and secondary inner oil chamber sections provided between the turbine runner and the clutch piston. Upon operation of a lock-up control device, the clutch piston is urged in a clutch switch-on direction, pressure in the primary inner oil chamber section relative to the outer oil chamber is raised and then pressure in the secondary inner oil chamber section is raised relative to the outer oil chamber.

6 Claims, 5 Drawing Sheets

FLUID TRANSMITTING DEVICE WITH LOCK-UP CLUTCH

BACKGROUND OF THE INVENTION

1. Field of the Invention

The present invention relates to a fluid transmitting device such as a torque converter, a fluid coupling and the like used in a power transmitting system of a vehicle and an industrial machine, and particularly to a fluid transmitting device with a lock-up clutch, which includes a pump impeller, a turbine runner defining a circulation circuit between the turbine runner itself and the pump impeller, a side cover connected to the pump impeller and defining a clutch chamber between the side cover itself and an outer surface of the turbine runner to communicate with an outer periphery of the circulation circuit, and a lock-up clutch disposed in the clutch chamber and capable of connecting the side cover and the turbine runner directly to each other, the lock-up clutch comprising a clutch piston axially movably connected to the turbine runner to divide the clutch chamber into an inner oil chamber on the side of the turbine runner and an outer oil chamber on the side of the side cover, a lock-up control means adapted to generate a difference in pressure between the inner oil chamber and the outer oil chamber in order to advance and retract the clutch piston toward and away from an inner surface of the side cover, and a friction engaging means for bringing the clutch piston and the side cover into friction engagement with each other, when the clutch piston is urged toward the inner surface of the side cover.

2. Description of the Related Art

A conventional fluid transmitting device with a lock-up clutch is known as disclosed in, for example, Japanese Patent Application Laid-open No. 5-296313.

In general, in the conventional fluid transmitting device with the lock-up clutch, a dragging-preventing gap is provided between the clutch piston and the side cover in a non-connected state of the lock-up clutch. Therefore, when the lock-up control means is operated to bring the lock-up clutch into a connected state, working oil is more or less leaked from the high-pressure inner oil chamber through the gap into the low-pressure outer oil chamber at an initial stage of the operation of the lock-up control means. This is one factor of the retardation in the operation of the lock-up clutch.

In order to eliminate the retardation in the operation of the lock-up clutch, in the fluid transmitting device disclosed in the above-described publication, a seal member is mounted on an outer periphery of the clutch piston to come into a close contact with an inner peripheral surface of the side cover, thereby preventing the leakage of the working oil. This fluid transmitting device has the following problems: It is required that a one-way valve is provided in the clutch piston in order to enable the working oil from the outer oil chamber to flow toward the inner oil chamber upon the release of the operation of the lock-up clutch, inevitably leading to an increase in the number of parts and in turn an increase in cost; in addition, the seal member on the outer periphery of the clutch piston always rubs against the inner peripheral surface of the side cover, when the pump impeller and the turbine runner are rotated relative to each other in the non-connected state of the lock-up clutch, so that it is difficult to ensure the durability of the seal member.

SUMMARY OF THE INVENTION

Accordingly, it is an object of the present invention to provide a fluid transmitting device with a lock-up clutch, wherein the connection responsiveness of the lock-up clutch is excellent, and moreover the number of parts is small, leading to a lower cost, and the durability is high.

To achieve the above object, according to a first feature of the present invention, there is provided a fluid transmitting device with a lock-up clutch, which includes a pump impeller, a turbine runner defining a circulation circuit between the turbine runner itself and the pump impeller, a side cover connected to the pump impeller and defining a clutch chamber between the side cover itself and an outer surface of the turbine runner to communicate with an outer periphery of the circulation circuit, and a lock-up clutch disposed in the clutch chamber and capable of connecting the side cover and the turbine runner directly to each other; the lock-up clutch comprising a clutch piston axially movably connected to the turbine runner to divide the clutch chamber into an inner oil chamber on the side of the turbine runner and an outer oil chamber on the side of the side cover, a lock-up control means adapted to generate a difference in pressure between the inner oil chamber and the outer oil chamber in order to advance and retract the clutch piston toward and away from an inner surface of the side cover, and a friction engaging means for bringing the clutch piston and the side cover into friction engagement with each other, when the clutch piston is urged toward the inner surface of the side cover; wherein the device includes a dividing means provided between the turbine runner and the clutch piston for dividing the inner oil chamber into a radially inner and substantially closed primary inner oil chamber section and a radially outer secondary inner oil chamber section, when the clutch piston occupies a retracted position in which at least the friction engaging means is inoperative, so that when the lock-up control means is operated to urge the clutch piston in a direction of engagement of the friction engaging means, the pressures in the primary inner oil chamber section and the secondary inner oil chamber section are raised in the named order relative to the outer oil chamber.

With the first feature, when the lock-up control means is operated to urge the clutch piston in the direction of engagement of the friction engaging means, the pressures in the primary inner oil chamber section and the secondary inner oil chamber section are raised in the named order relative to the outer oil chamber. Specifically, the clutch piston can be first advanced in a direction to operate the friction engaging means by the quick raising of the pressure in the primary inner oil chamber section, thereby inhibiting the leakage of the working oil from the secondary inner oil chamber section to the outer oil chamber. Thus, the raising of the pressure in the secondary inner oil chamber section can be also hastened, and as a result the raising of the pressures in the primary inner oil chamber section and the secondary inner oil chamber section as a whole can be hastened, whereby the clutch piston can be urged quickly and powerfully toward the side cover to enhance the connection responsiveness of the lock-up clutch. Moreover, the urging force on the clutch piston is sequentially generated in the primary inner oil chamber section and the secondary inner oil chamber section, whereby the shock of the connection of the lock-up clutch can be alleviated.

In the disconnected state of the lock-up clutch, a relative rotation does not occur in the dividing means, and hence the durability of the dividing means can be ensured.

Further, in the disconnected state of the lock-up clutch, the flowing of the working oil from the outer oil chamber to the inner oil chamber can be conducted smoothly without recourse to a one-way valve required in the prior art, and the cooling of the lock-up clutch can be achieved. In addition, the number of parts can be reduced because no one-way valve is required, to thereby contribute to a reduction in cost.

According to a second feature of the present invention, in addition to the first feature, a through-bore is provided in the turbine runner to permit the primary inner oil chamber section to communicate with the circulation circuit.

With the second feature, during the decelerating operation of the fluid transmitting device in which the turbine runner is in a position to drive the pump impeller, the pressure in an area of the circulation circuit on the side of the turbine runner becomes high, whereby the working oil flows from the circulation circuit through the through-bore into the primary inner oil chamber section to raise the pressure in the primary inner oil chamber section. Therefore, when the lock-up control means is operated to urge the clutch piston in the direction of engagement of the friction engaging means, the raising of the pressures in the primary and secondary inner oil chamber sections can be hastened as a whole in correspondence to an increment in already raised pressure in the primary inner oil chamber section, and hence the connection responsiveness of the lock-up clutch can be further effectively enhanced.

During the accelerating operation in which the pump impeller is rotated at a speed higher than the turbine runner, the pressure in the area of the circulation circuit on the side of the turbine runner is lower, and hence the working oil in the primary inner oil chamber section flows through the through-bore into the circulation circuit to lower the pressure in the primary inner oil chamber section, but the dropping of the pressure in the primary inner chamber section does not involve the secondary inner chamber section, because the through-bore does not communicate with the secondary inner chamber section and moreover, the primary and secondary inner chamber sections are partitioned from each other by the dividing means. Moreover, the secondary inner chamber section is maintained at a relatively high pressure, because it communicates with the outer periphery of the circulation circuit. Therefore, when the lock-up control valve is operated to bring the lock-up clutch from this state into the connected state, the clutch piston is operated in the direction of engagement of the friction engaging means by a difference in pressure between the high-pressure secondary inner chamber section and the low-pressure outer chamber, whereby the lock-up clutch can be brought into the connected state without hindrance.

The fluid transmitting device corresponds to a torque converter T in each of embodiments of the present invention which will be described hereinafter; the friction engaging means corresponds to a friction surface 5b and a friction lining 28, and the lock-up control means corresponds to a lock-up control valve 42.

The above and other objects, features and advantages of the invention will become apparent from the following description of the preferred embodiment taken in conjunction with the accompanying drawings.

DESCRIPTION OF THE PREFERRED EMBODIMENTS

Figure 1:
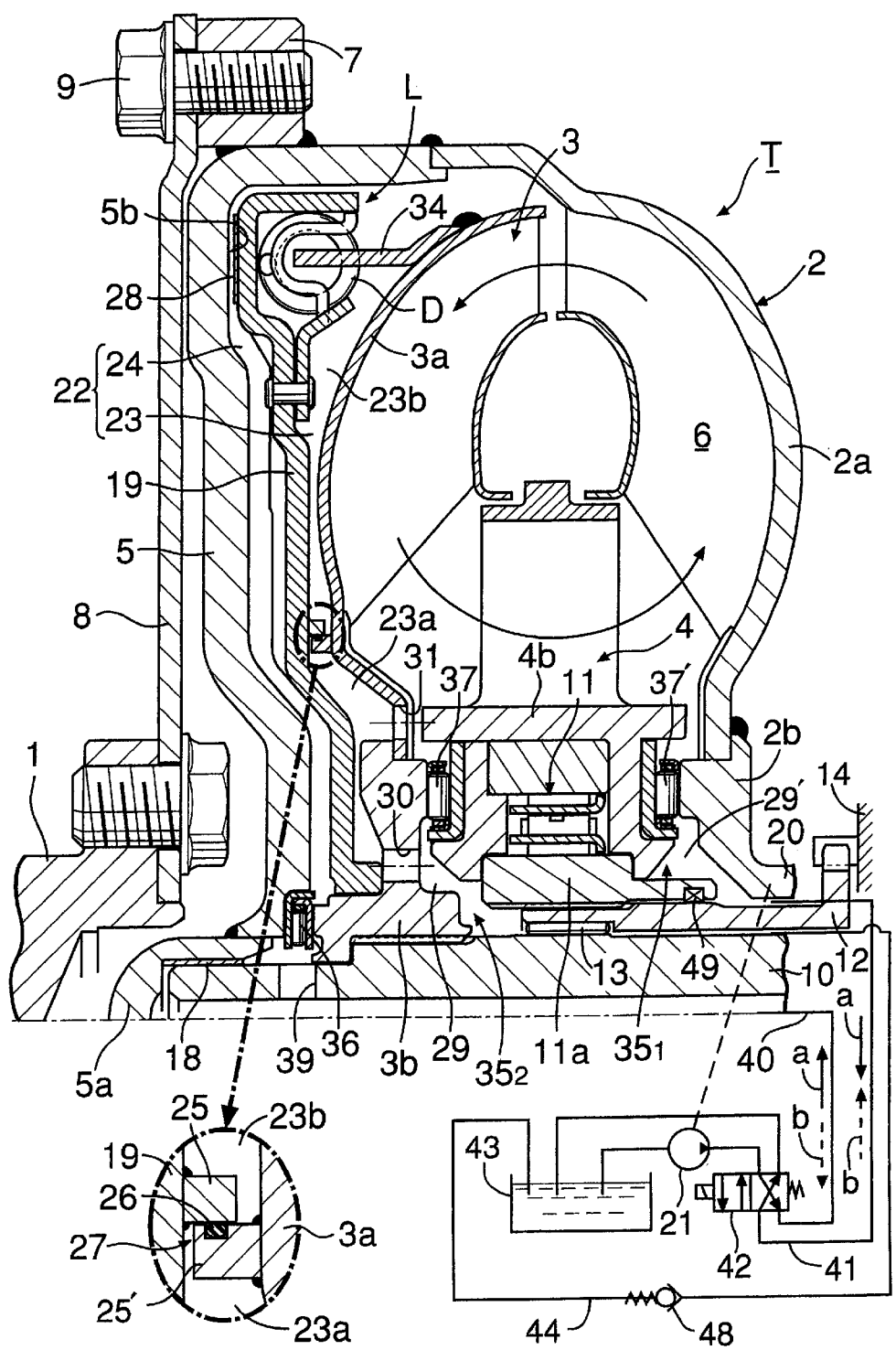
FIG. 1 is a vertical sectional view of a torque converter with a lock-up clutch according to a first embodiment of the present invention.

Referring first to FIG. 1, a torque converter T as a fluid transmitting device includes a pump impeller 2, a turbine runner 3 opposed to the pump impeller 2, and a stator 4 disposed between inner peripheries of the pump impeller 2 and the turbine runner 3. A circulation circuit 6 for transmitting a power by a working oil is defined among the three members 2, 3 and 4.

Aside cover 5 is integrally connected to an outer periphery of a shell 2a of the pump impeller 2 by welding, to cover an outer side face of the turbine runner 3. A plurality of connecting bosses 7 are arranged circumferentially around and welded to an outer peripheral surface of the side cover 5. A drive plate 8 coupled to a crankshaft 1 of an engine is secured to the connecting bosses 7 by a bolt 9. A thrust needle bearing 36 is interposed between a hub 3b of the turbine runner 3 and the side cover 5.

An output shaft 10 is disposed at the center of the torque converter T to be coaxial with the crankshaft 1. The output shaft 10 is spline-fitted to the hub 3b of the turbine runner 3 and rotatably carried on a support tube 5a provided at the center of the side cover 5 with a bearing bushing 18 interposed therebetween. The output shaft 10 is a main shaft of a multi-stage transmission (not shown).

A cylindrical stator shaft 12 is disposed around an outer periphery of the output shaft 10, and carries a hub 4b of the stator 4 through a free wheel 11. A needle bearing 13 is interposed between the output shaft 10 and the stator shaft 12 to permit the relative rotations of them. The stator shaft 12 is non-rotatably supported at its outer end on a transmission case 14.

Thrust needle bearings 37 and 37' are interposed between axially opposite end faces of the hub 4b of the stator 4 and end faces of hubs 2b and 3b of the pump impeller 2 and the turbine runner 3 which are opposed to the axially opposite end faces. The axial movements of the turbine runner 3 and the stator 4 between the pump impeller 2 and the side cover 5 are restricted by the thrust needle bearings 37 and 37' and the thrust needle bearing 36.

An auxiliary-driving shaft 20 coupled to the pump impeller 2 is disposed relatively rotatably around an outer periphery of the stator shaft 12, and drives an oil pump 21 to supply the working oil to the torque converter T.

A clutch chamber 22 is defined between the turbine runner 3 and the side cover 5 to communicate with the circulation circuit 6 on the side of an outer periphery. A lock-up clutch L is mounted in the clutch chamber 22 and capable of coupling the turbine runner 3 and the side cover 5 directly to each other. More specifically, a clutch piston 19 constituting a main member of the lock-up clutch L is disposed in the clutch chamber 22 in such a manner that it divides the clutch chamber 22 into an inner oil chamber 23 on the side of the turbine runner 3 and an outer oil chamber 24 on the side of the side cover 5. The clutch piston 19 is slidably carried on an outer peripheral surface of the hub 3b of the turbine runner 3 and has a friction lining 28 opposed to an annular friction surface 5b formed on an inner surface of the side cover 5. In addition, the clutch piston 19 is connected axially movably through a known torque damper D to a transmitting plate 34 fixedly mounted on an outer surface of the turbine runner 3.

Annular partition walls 25 and 25' are formed on opposed surfaces of the shell 3a of the turbine runner 3 and the clutch piston 19 so that they are slidably and rotatably fitted to each other. A seal member 26 is mounted on one of opposed peripheral surfaces of the partition walls 25 and 25', so that it is in slidably close contact with the other opposed peripheral surface. The partition walls 25 and 25' constitute a dividing means 27 for dividing the inner oil chamber 23 in the clutch chamber 22 into a radially inner primary inner oil chamber section 23a and a radially outer secondary inner oil chamber section 23b. The partition wall 25' on the side of the turbine runner 3 may be provided on the hub 3b of the turbine runner 3.

A through-bore 30 is provided in the hub 3b of the turbine runner 3 to permit the primary inner oil chamber section 23a to communicate with an annular oil passage 29 between the hub 3b of the turbine runner 3 and the hub 4b of the stator 4 on the side of the inner periphery of the thrust needle bearing 37. A through-bore 31 is provided in the shell 3a of the turbine runner 3 to permit the primary inner oil chamber section 23a to communicate with the inside of the shell 3a.

A first oil passage 40 is provided at the center of the output shaft 10 to communicate with the outer oil chamber 24 in the clutch chamber 22 through a transverse bore 39 and the thrust needle bearing 36. A second oil passage 41 is defined between the auxiliary-driving shaft 20 and the stator shaft 12, and communicates with an inner periphery of the circulation circuit 6 through an annular oil passage 29' between the hub 2b of the pump impeller 2 and the hub 4b of the stator 4 and through the thrust needle bearing 37'.

A third oil passage 44 is defined between the output shaft 10 and the stator shaft 12, and communicates with the inner periphery of the circulation circuit 6 and with the primary inner oil chamber section 23a through the annular oil passage 29 between the hub 3b of the turbine runner 3 and the hub 4b of the stator 4 as well as through the through-bores 30 and 31 and the thrust needle bearing 37. In this case, to cut off the communication between the annular oil passages 29 and 29', a seal member 49 is interposed between an inner race 11a of the free wheel 11 and the stator shaft 12.

The first oil passage 40 and the second oil passage 41 are adapted to be alternately connected to a discharge side of the oil pump 21 and an oil reservoir 43 by a lock-up control valve 42, and also connected to the oil reservoir 43 through a relief valve 48 for maintaining the circulation circuit 6 and the primary inner oil chamber section 23a under a predetermined pressure. Therefore, a surplus pressure in the circulation circuit 6 and the primary inner oil chamber section 23a is released to the oil reservoir 43 through the relief valve 48.

The operation of this embodiment will be described below.

In a driven state of the torque converter T, the lock-up control valve 42 is controlled by an electronic control unit (not shown), to connect the first oil passage 40 to the discharge side of the oil pump 21, and on the other hand connects the second oil passage 41 to the oil reservoir 43. Therefore, when an output torque from the crankshaft 1 of the engine is sequentially transmitted to the drive plate 8, the side cover 5 and the pump impeller 2 to drive the pump impeller 2 to rotate, and further drive the oil pump 21, the working oil discharged by the oil pump 21 flows as shown by an arrow a from the lock-up control valve 42 sequentially via the first oil passage 40, the transverse bore 39 and the thrust needle bearing 36, the outer oil chamber 24 in the clutch chamber 22 and the second inner oil chamber section 23b of the inner oil chamber 23, into the circulation circuit 6 to fill the circuit 6. Thereafter, the working oil flows via the thrust needle bearing 37' and the annular oil passage 29' into the second oil passage 41, and then flows through the lock-up control valve 42 back to the oil reservoir 43.

In the clutch chamber 22, the pressure in the outer oil chamber 24 is higher than that in the inner oil chamber 23 due to the working oil flowing in the above-described manner, and the clutch piston 19 is retracted away from the friction surface 5b of the side cover 5 by a difference between such pressures. Therefore, the lock-up clutch L is in a disconnected state, whereby the relative rotations of the pump impeller 2 and the turbine runner 3 are permitted. Thus, when the pump impeller 2 is driven to rotate by the crankshaft 1, the working oil filling the circulation circuit 6 circulates in the circulation circuit 6 as shown by arrows, whereby the rotational torque of the pump impeller 2 is transmitted to the turbine runner 3 to drive the output shaft 10.

In this process, if a torque amplifying effect is generated between the pump impeller 2 and the turbine runner 3, a reaction force resulting from such an effect is borne by the stator 4, and the stator 4 is fixed by the locking action of the free wheel 11.

When the lock-up control valve 42 is switched over by the electronic control unit to bring the lock-up clutch L into a connected state during the driving operation of the torque converter T, or during a decelerating operation of the torque converter T in which the turbine runner 3 is in a position to drive the pump impeller 2 to cause the working oil to flow in a direction opposite from the direction indicated by the arrows in the circulation circuit 6, the working oil discharged from the oil pump 21 flows in a direction opposite from the above-described direction, as shown by an arrow b, that is, from the lock-up control valve 42 sequentially via the second oil passage 41, the annular oil passage 29' and the thrust needle bearing 37' into the circulation circuit 6. Then, the working oil passes through the through-bores 30 and 31 into the primary inner oil chamber section 23a, and on the other hand passes through the outer periphery of the circulation circuit 6 into the secondary inner oil chamber section 23b.

The outer oil chamber 24 in the clutch chamber 22 is opened into the oil reservoir 43 through the first oil passage 40 and the lock-up control valve 42.

The working oil introduced into the secondary inner oil chamber section 23b is more or less leaked into the lower-pressure outer oil chamber 24 through a gap between the clutch piston 19 and the side cover 5, whereby the raising of the pressure in the secondary inner oil chamber section 23b is retarded. On the other hand, as soon as the working oil is introduced into the secondary inner oil chamber section 23b, the pressure in the secondary inner oil chamber section 23b is raised immediately to become higher than that in the outer oil chamber 24, because the first inner oil chamber section 23a is partitioned from the secondary inner oil chamber section 23b by the partition walls 25 and 25', and moreover is maintained in a substantially sealed state by the relief valve 48. Therefore, clutch piston 19 is advanced toward the friction surface 5b of the side cover 5 in sensitive response to the difference between the pressures, whereby the friction lining 28 is brought into pressure contact with the friction surface 5b. Thus, the leakage of the working oil from the secondary inner oil chamber section 23b of the inner oil chamber 23 into the outer oil chamber 24 is inhibited by such pressure contact, and hence the pressure in the secondary inner oil chamber section 23b is also raised by the working oil subsequently introduced thereinto from the circulation circuit 6, whereby the clutch piston 19 is urged further powerfully toward the side cover 5. In this manner, the lockup clutch L is brought into a powerful connected state.

Thus, if the lock-up control valve 42 is switched over to connect the lock-up clutch L during either of the driving operation and the decelerating operating of the torque converter T, the pressure in the primary inner oil chamber section 23a is first raised relative to the outer oil chamber 25 to enhance the connection responsiveness of the clutch piston 19. Thus, the pressure in the secondary inner oil chamber section 23b can be also raised without a large retardation by inhibiting the leakage of the working oil from the secondary inner oil chamber section 23b of the inner oil chamber into the outer oil chamber 24, so that the raising of the pressures in the primary and secondary inner oil chamber sections 23a and 23b is hastened as a whole, leading to an enhancement in connection responsiveness of the lock-up clutch L. Moreover, an advancing/urging force for the clutch piston 19 is sequentially generated in the primary inner oil chamber section 23a and the secondary inner oil chamber section 23b, whereby the shock of the connection of the lock-up clutch L can be alleviated.

To further enhance the connection responsiveness of the clutch piston 19 particularly during the decelerating operation, it is effective that a through-bore is provided in the shell 3a of the turbine runner 3 to permit the communication between the circulation circuit 6 and the secondary inner oil chamber section 23b. Namely, during the decelerating operation, the flow of the working oil in the circulation circuit 6 is opposite from the direction indicated by the arrow in FIG. 1, and the pressure in an area of the circulation circuit 6 on the side of the shell 3a is relatively high, and the working oil in such area flows through the through-bore into the secondary inner oil chamber section 23b to raise the pressure in the chamber section 23b, leading to the enhancement in connection responsiveness of the clutch piston 19. During a slowly accelerating operation, the flow of the working oil in the circulation circuit 6 is in the direction indicated by the arrow in FIG. 1, and the pressure in an area of the circulation circuit 6 in the vicinity of the through-bore is relatively low. This results in that the oil pressure in the secondary inner oil chamber section 23b escapes from the through-bore toward the circulation circuit 6, and the retardation of the operation of the clutch piston 19 is brought about in contrast with the case during the decelerating operation. Therefore, when the through-bore as described above is provided, it is necessary to select the position and the size of the through-bore in consideration of the balance between the enhancement in connection responsiveness of the clutch piston 19 during the decelerating operation and the reduction in connection responsiveness of the clutch piston 19 during the slowly accelerating operation.

When the lock-up control valve 42 is switched over to disconnect the lock-up clutch L again, the working oil flows from the outer oil chamber 24 toward the inner oil chamber 23 to retract the clutch piston 19 away from the friction surface 5b of the side cover 5 by the difference between the pressures in the outer and inner oil chambers 24 and 23, and then flows from the circulation circuit 6 to the second oil chamber 41. Therefore, the flow of the working oil from the outer oil chamber 24 toward the inner oil chamber 23 can be ensured without provision of a one-way valve as in the prior art device, and the cooling of the lock-up clutch L can be promoted. Therefore, the number of parts can be reduced, because the one-way valve is eliminated, so that it is possible to provide the torque converter T with the lock-up clutch at a low cost.

In the disconnected state of the lock-up clutch L, the torque damper D is not operated, and hence the partition walls 25 and 25' are not rotated relative to each other by the rotation of the turbine runner 3 and the clutch piston 19 in unison with each other. In the connected state of the lock-up clutch L, the partition walls 25 and 25' are rotated relative to each other only in a range of angle of operation of the torque damper D and hence, the friction of the seal member 26 is extremely small, whereby the durability of the seal member 26 can be easily ensured.

In the first embodiment, when the leakage of the working oil from the primary inner oil chamber section 23a to the secondary inner oil chamber section 23b is permitted more or less, the seal member 26 can be eliminated from the partition walls 25 and 25' constituting the dividing means 28.

Figure 2:
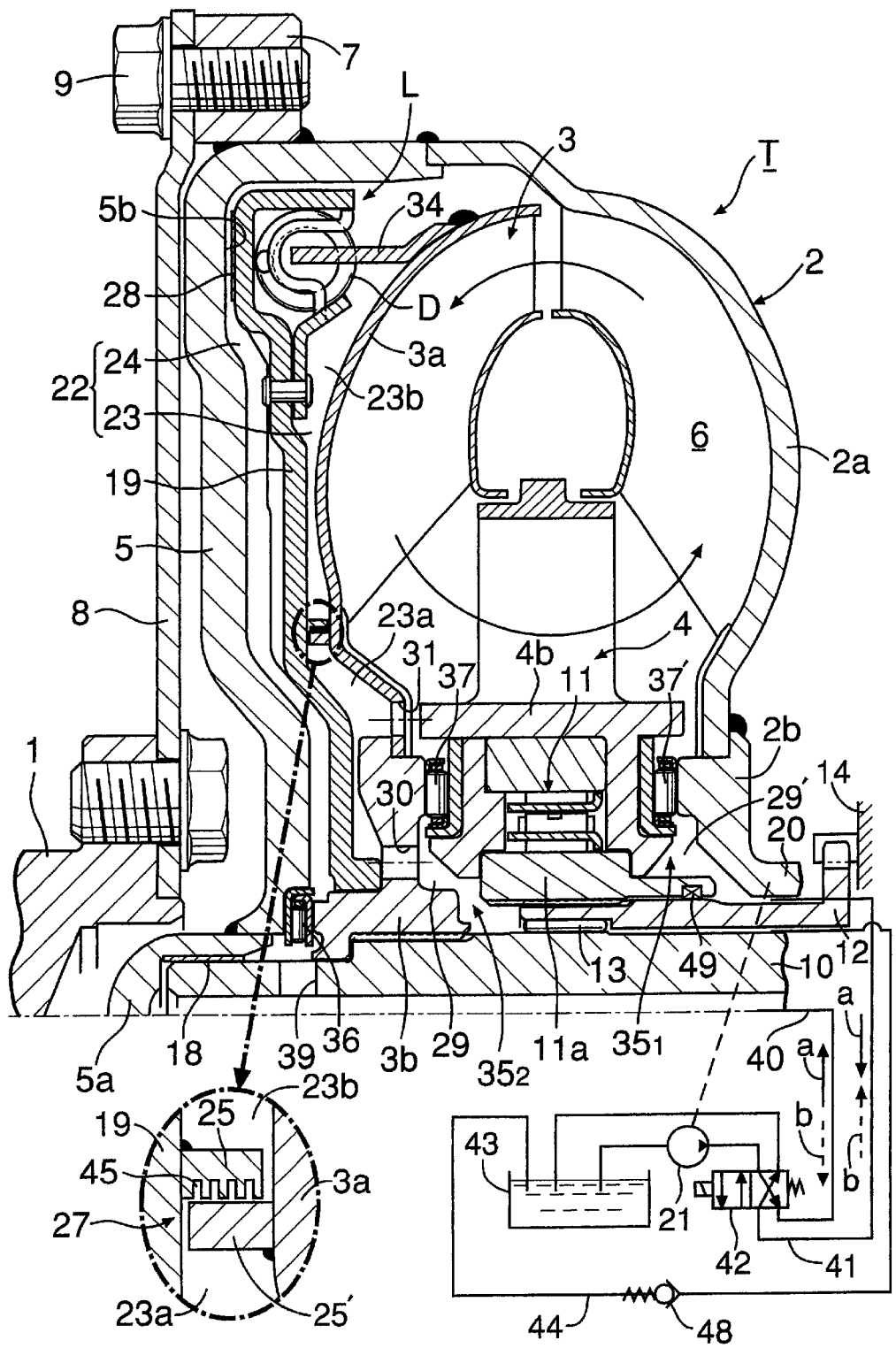
FIG. 2 is a view similar to FIG. 1, but according to a second embodiment of the present invention.

A second embodiment of the present invention shown in FIG. 2 will now be described.

The second embodiment is of an arrangement similar to that in the first embodiment, except that a labyrinth packing 45 is arranged between the partition walls 25 and 25' slidably and rotatably fitted to each other. Therefore, portions or components corresponding to those in the first embodiment are denoted by the same reference numerals in FIG. 2, and the descriptions thereof are omitted.

In the second embodiment, during a lock-up control carried out by the lock-up control valve, while eliminating the friction resistance between the partition walls 25 and 25', the leakage of the working oil from the primary inner oil chamber section 23a to the secondary inner oil chamber section 23b can be prevented, to further enhance the operation responsiveness of the clutch piston 19.

Figure 3:
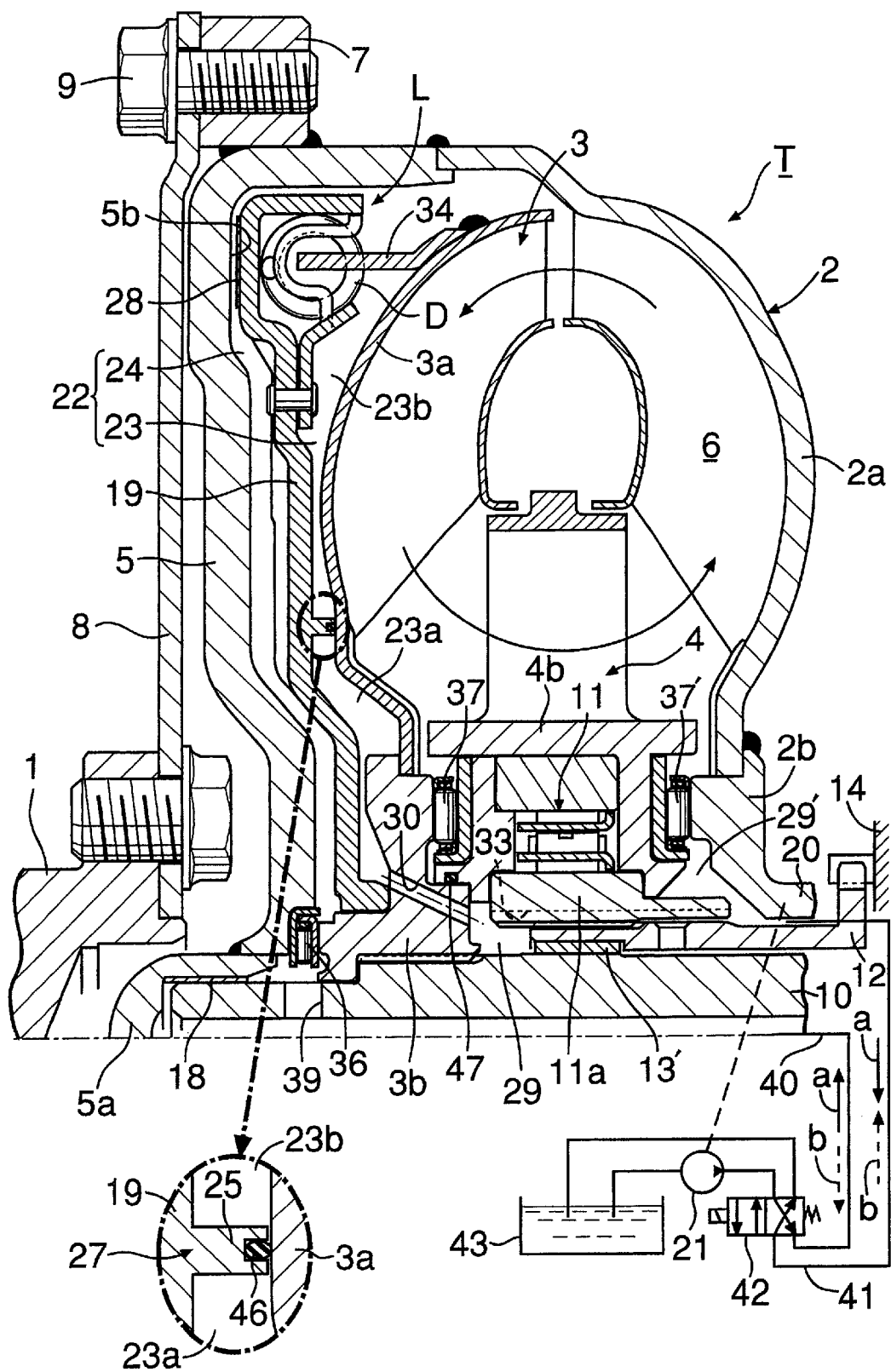
FIG. 3 is a view similar to FIG. 1, but according to a third embodiment of the present invention.

A third embodiment of the present invention shown in FIG. 3 will now be described.

In the third embodiment, an annular partition wall 25 is formed on one of opposed surfaces of the turbine runner 3 and the clutch piston 19. A seal member 46 is mounted on an end face of the partition wall 25 to protrude annularly therefrom. The seal member 46 is constructed so that when the clutch piston 19 is retracted to a non-connected position spaced apart from the friction surface 5b of the side cover 5, the seal member 46 is brought into close contact with the other of the opposed surfaces of the turbine runner 3 and the clutch piston 19 to divide the inner oil chamber 23 into a radially inner primary inner oil chamber section 23a and a radially outer secondary inner oil chamber section 23b.

The second oil passage 41 communicates not only with the annular oil passage 29' but also with the annular oil passage 29 through an oil groove 33 defined in the inner race 11a of the free wheel 11. A seal member 47 is interposed between the hub 3b of the turbine runner 3 and the hub 4b of the stator 4 in order to effectively introduce the working oil supplied from the second oil passage 41 to the annular oil passage 29, into the primary inner oil chamber section 23a through the through-bore 30. A bushing 13' is disposed between the output shaft 10 and the stator shaft 12, in place of the needle bearing 13 in the first embodiment.

In the other respects, the third embodiment is of an arrangement similar to that in the first embodiment, except that the third oil passage 44 in the first embodiment is not provided. Therefore, portions or components corresponding to those in the first embodiment are denoted by the same reference numerals in FIG. 3, and the descriptions thereof are omitted.

When the working oil is supplied to the primary inner oil chamber section 23a during the lock-up control conducted by the lock-up control valve 42, the pressure in the primary inner oil chamber section 23a is raised immediately to urge the clutch piston 19 toward the side cover 5, thereby bringing the friction lining 28 into pressure contact with the inner surface of the side cover 5. When the seal member 46 on the partition wall 25 is moved away from the opposed surface of the turbine runner 3 or the clutch piston 19 with movement of the clutch piston 19, the working oil flows from the primary inner oil chamber section 23a through a gap provided between the seal member 46 and the opposed surface into the secondary inner oil chamber section 23b. The working oil is prevented from leaking to the outer oil chamber 24 by the pressure contact of the friction surface 5b and the friction lining 28 with each other, so that the pressure in the secondary inner oil chamber section 23b is immediately raised. Therefore, even in this case, the lock-up clutch L is reliably brought into the connected state with a good responsiveness. Moreover, the seal member 46 is put in a non-contact state with the opposed surface of the turbine runner 3 or the clutch piston 19 in the operative state of the lock-up clutch L and hence, the friction of the seal member 46 is extremely small, whereby the durability thereof can be enhanced.

In the third embodiment, the seal member 46 maybe removed, and the partition wall 25 may be in metal contact with the opposed surface of the turbine runner 3 or the clutch piston 19.

Figure 4:
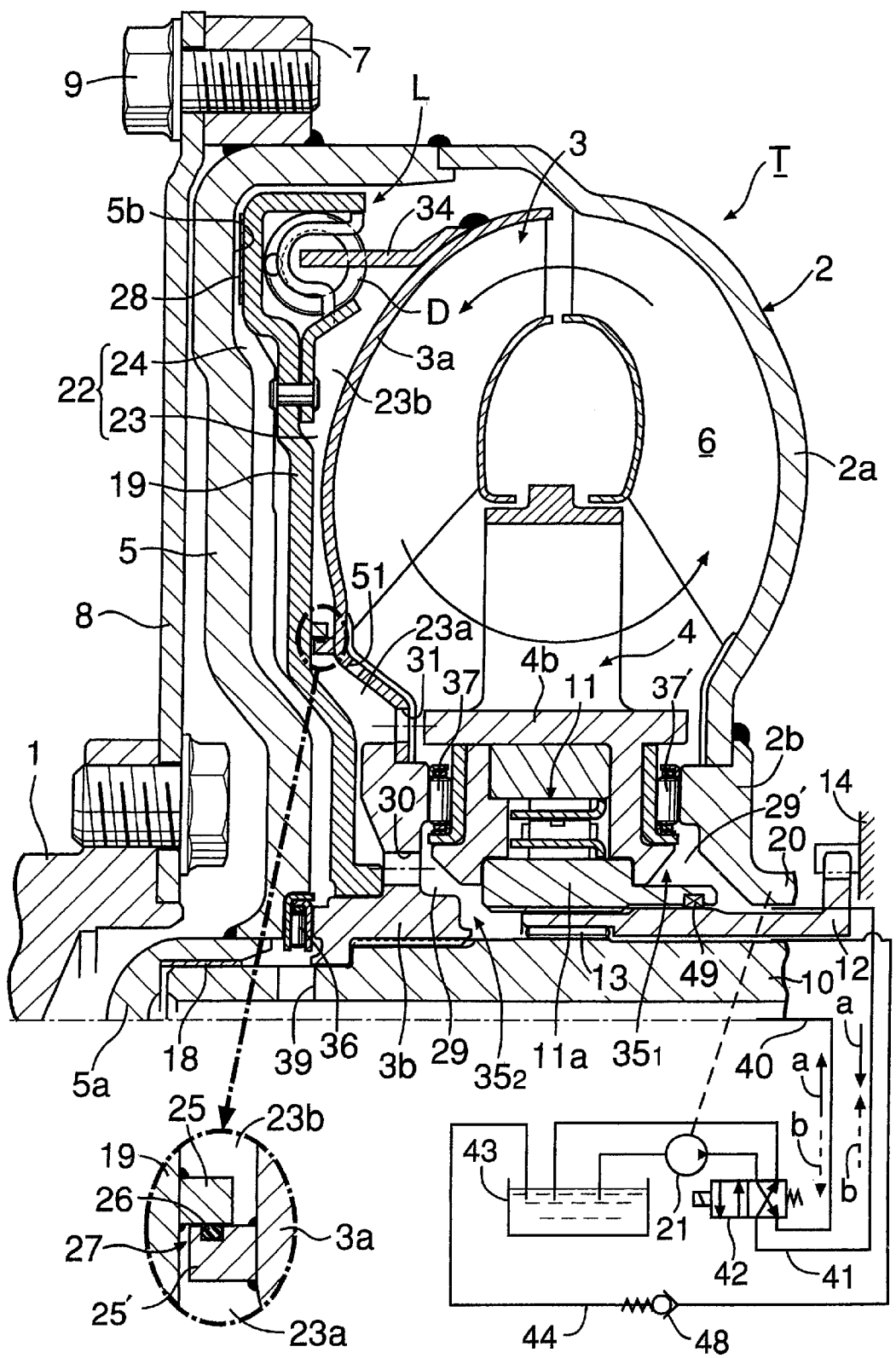
FIG. 4 is a view similar to FIG. 1, but according to a fourth embodiment of the present invention.

Next, a fourth embodiment of the present invention shown in FIG. 4 will be described below.

The fourth embodiment is of an arrangement similar to that in the first embodiment, except that a single or a plurality of through-bores 51 are provided in the shell 3a of the turbine runner 3 to permit the primary inner chamber section 23a to communicate with the circulation circuit 6. Therefore, portions or components corresponding to those in the first embodiment are denoted by the same reference numerals, and the descriptions thereof are omitted.

With the fourth embodiment, during the decelerating operation of the torque converter T in which the turbine runner 3 is in a position to drive the pump impeller 2, the pressure in an area of the circulation circuit 6 on the side of the turbine runner 3 is relatively high, whereby the working oil flows from the circulation circuit 6 through the through-bore or bores 51 in the shell 3a of the turbine runner 3 into the primary inner chamber section 23a, to raise the pressure in the primary inner chamber section 23a. Therefore, during the lock-up control by the lock-up control valve 42, the raising of the pressure in the primary and secondary inner chamber sections 23a and 23b can be hastened and hence, the connection responsiveness of the lock-up clutch L can be further effectively enhanced.

On the other hand, during the accelerating operation in which the lock-up clutch L is disconnected, and the pump impeller 2 is rotated at a speed higher than the turbine runner 3, the working oil flows in the circulation circuit 6 in a direction indicated by an arrow and as a result, the pressure in an area of the circulation circuit 6 on the side of the turbine runner 3 is lower than that in an area on the side of the pump impeller 2. Therefore, the working oil in the primary inner chamber section 23a flows therefrom through the through-bore or bores 51 into the circulation circuit 6, to lower the pressure in the primary inner chamber section 23a. However, the decrease of the pressure in the primary inner chamber section 23a does not involve the secondary inner chamber section 23b, because the through-bore or bores 51 do not communicate with the secondary inner chamber section 23b, and more over the primary and secondary inner chamber sections 23a and 23b are partitioned from each other by the dividing means 27. Moreover, the secondary inner chamber section 23b is maintained at a relatively high pressure, because it communicates with the outer periphery of the circulation circuit 6. Therefore, when the lock-up control valve 42 is switched over to bring the lock-up clutch L from this state into the connected state, the clutch piston 19 is operated to move toward the side cover 5 by a difference in pressure between the high-pressure secondary inner chamber section 23b and the low-pressure outer chamber 24, whereby the lock-up clutch L can be brought into the connected state without hindrance.

Figure 5:
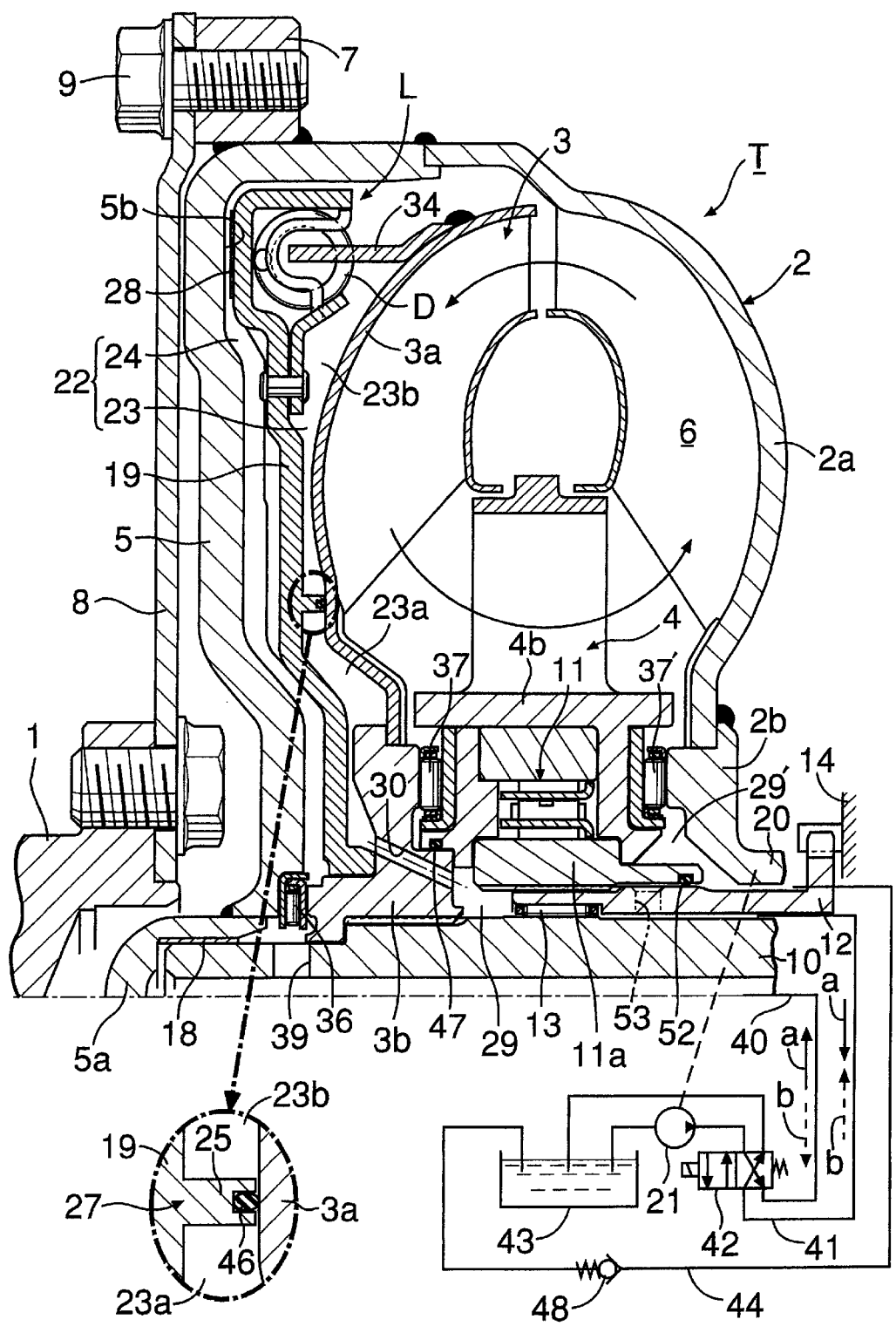
FIG. 5 is a view similar to FIG. 1, but according to a fifth embodiment of the present invention.

Lastly, a fifth embodiment of the present invention shown in FIG. 5 will now be described.

In the fifth embodiment, the second oil passage 41 communicates with the annular oil passage 29 through the needle bearing 13 disposed between the output shaft 10 and the stator shaft 12, and further with the primary inner oil chamber section 23a through the through-bore 30. In this structure, a seal member 52 is disposed in the spline-fitting portion between the inner race 11a of the free wheel 11 and the stator shaft 12, in order to prevent oil leak from the annular oil passage 29 to the spline-fitting portion.

The other structural components are the same as those in the third embodiment. Therefore, the components corresponding to those in the third embodiment are denoted by the same reference numerals and characters in FIG. 5, and the descriptions thereof are omitted.

According to the fifth embodiment, during the lock-up control by the lock-up control valve 42, the working oil discharged from the oil pump 21 flows through the second oil passage 41 in the direction indicated by an arrow b, passes the needle bearing 13, the annular oil passage 29 and the through-bore 30, to be supplied to the primary inner oil chamber section 23a. Since the circulation circuit 6 is not present in the above-described route, the working oil which has been pressure-regulated by the lock-up control valve 42 is efficiently supplied to the primary inner oil chamber section 23a without further changing its pressure or being influenced by the operational state of the torque converter T, whereby fine control of connection of the lock-up clutch can be achieved.

In the case where the needle bearing 13 is replaced by the bushing, if a through-bore 53 is provided in the stator shaft 12 between the bushing and the seal member 52 so as to cause the working oil flowing through the second oil passage 41 in the direction indicated by the arrow b to pass the through-bore 53, the spline-fitting portion between the inner race 11a of the free wheel 11 and the stator shaft 12, the annular oil passage 29 and the through-bore 30, to be supplied to the primary inner oil chamber section 23a during the lock-up control by the lock-up control valve 42, the same effect as described above can be obtained.

Although the embodiments of the present invention have been described in detail, it will be understood that the present invention is not limited to the above-described embodiments, and various modifications in design may be made without departing from the spirit and scope of the invention defined in the claims. For example, the present invention is applicable to a fluid coupling having no stator 4. The through-bore or bores 51 provided in the turbine runner 3 in the fourth embodiment may be provided in the turbine runner 3 in each of the second and third embodiments.

What is claimed is:

1. A fluid transmitting device comprising: a pump impeller, a turbine runner defining a circulation circuit between said turbine runner itself and said pump impeller, a side cover connected to said pump impeller and defining a clutch chamber between said side cover itself and an outer surface of said turbine runner to communicate with an outer periphery of said circulation circuit, and a lock-up clutch disposed in said clutch chamber and capable of connecting said side cover and said turbine runner directly to each other, said lock-up clutch comprising a clutch piston axially movably connected to said turbine runner to divide said clutch chamber into an inner oil chamber on the side of said turbine runner and an outer oil chamber on the side of said side cover, a lock-up control means adapted to generate a difference in pressure between said inner oil chamber and said outer oil chamber in order to advance and retract said clutch piston toward and away from an inner surface of said side cover, and a friction engaging means for bringing said clutch piston and said side cover into friction engagement with each other, when said clutch piston is urged toward the inner surface of said side cover, wherein said fluid transmitting device further includes a dividing means provided between said turbine runner and said clutch piston for dividing said inner oil chamber into a radially inner and substantially closed primary inner oil chamber section and a radially outer secondary inner oil chamber section, when said clutch piston occupies a retracted position in which at least the friction engaging means is inoperative, so that when said lock-up control means is operated to urge said clutch piston in a direction of engagement of said friction engaging means, a pressure in said primary inner oil chamber section is raised relative to said outer oil chamber and then a pressure in said secondary inner oil chamber section is raised relative to said outer oil chamber.

2. A fluid transmitting device with a lock-up clutch according to claim 1, wherein said turbine runner has a through-bore to permit said primary inner oil chamber section to communicate with said circulation circuit.

3. A fluid transmitting device with a lock-up clutch according to claim 1 or 2, wherein said dividing means comprises annular partition walls which are formed on opposed surfaces of a shell of said turbine runner and said clutch piston respectively and which are slidably and rotatably fitted to each other.

4. A fluid transmitting device with a lock-up clutch according to claim 3, further including a seal member which is mounted on one of opposed peripheral surfaces of said annular partition walls formed on the opposed surfaces of the shell of said turbine runner and said clutch piston respectively and which is slidably and rotatably fitted to each other, the seal member being in slidably close contact with the other opposed peripheral surface.

5. A fluid transmitting device with a lock-up clutch according to claim 3, further including a labyrinth packing arranged between said partition walls.

6. A fluid transmitting device with a lock-up clutch according to claim 1 or 2, wherein said dividing means comprises an annular partition wall formed on one of opposed surfaces of said turbine runner and said clutch piston, and a seal member mounted on said partition wall to protrude annularly from an end face of said partition wall, said seal member being brought into close contact with the other of the opposed surfaces of said turbine runner and said clutch piston, when said clutch piston is retracted to a non-connected position spaced apart from said side cover.

* * * * *